United States Patent [19]

Han et al.

[11] Patent Number: 4,753,910

[45] Date of Patent: Jun. 28, 1988

[54] DEALUMINATION OF ALUMINOSILICATE ZEOLITES

[75] Inventors: Scott Han, Lawrenceville; David S. Shihabi, Pennington, both of N.J.

[73] Assignee: Mobil Oil Corporation, New York, N.Y.

[21] Appl. No.: 15,651

[22] Filed: Feb. 17, 1987

[51] Int. Cl.$^4$ ............................................. B01J 29/06
[52] U.S. Cl. ...................................... 502/85; 423/328
[58] Field of Search ........................... 502/85; 423/328

[56] References Cited

U.S. PATENT DOCUMENTS

| | | | |
|---|---|---|---|
| 3,933,983 | 1/1976 | Elliott | 423/328 |
| 4,414,189 | 11/1983 | Kokotailo et al. | 502/85 |
| 4,503,023 | 3/1985 | Breck | 423/328 |
| 4,569,833 | 2/1986 | Gortsema et al. | 502/85 |
| 4,597,956 | 7/1986 | Hinchey et al. | 423/328 |
| 4,678,766 | 7/1987 | Rosinski | 502/85 |

FOREIGN PATENT DOCUMENTS 0134326  3/1985  European Pat. Off. .

Primary Examiner—Carl F. Dees
Attorney, Agent, or Firm—Alexander J. McKillop; Michael G. Gilman; Peter W. Roberts

[57] ABSTRACT

In a method of removing tetrahedral aluminum from a aluminosilicate zeolite, the zeolite is treated with an aqueous fluorosilicate solution which reacts with tetrahedral aluminum in said zeolite to produce water-insoluble aluminum fluoride. In addition, during or after the aluminum removal, the zeolite is contacted with an aqueous solution containing a water-soluble fluoride of reacting with the insoluble aluminum fluoride to produce a water-soluble species.

14 Claims, 1 Drawing Sheet

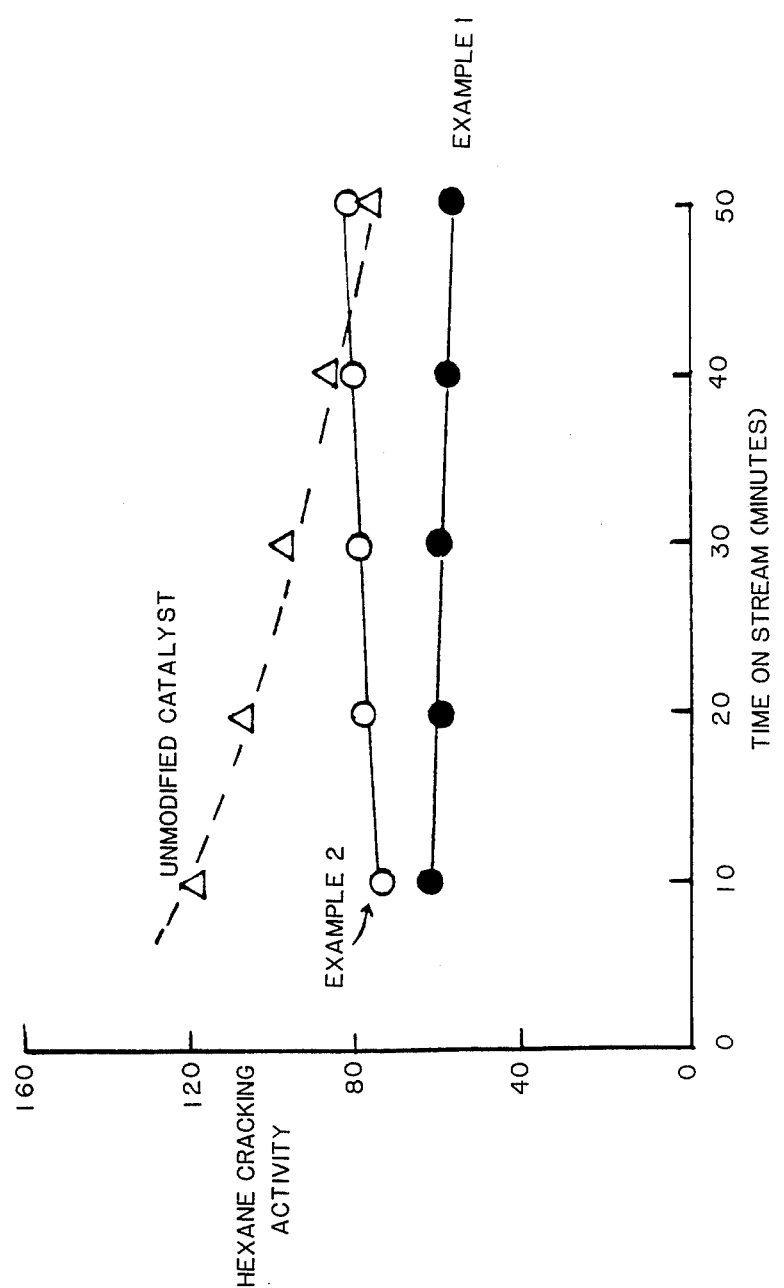

DEALUMINATION OF ALUMINOSILICATE ZEOLITES

BACKGROUND TO THE INVENTION

This invention relates to a method of treating an aluminosilicate zeolite to remove tetrahedral aluminum therefrom.

A vast number of naturally-occurring and synthetic aluminosilicate zeolites are known. Among the more commercially important zeolites are zeolite Y (U.S. Pat. No. 3,130,007), zeolite beta (U.S. Pat. No. 3,338,069, reissued as RE. No. 28341) and ZSM-5 (U.S. Pat. No. 3,702,886). These zeolites find application in a wide variety of commercial processes, particularly hydrocarbon conversion processes.

The silica-to-alumina ratio of a zeolite is often variable; for example, zeolite Y can be synthesized with a silica-to-alumina ratio ranging from 3 to about 6. In some zeolites, for example ZSM-5, the upper limit of silica-to-alumina ratio is virtually unbounded. Thus U.S. Pat. No. 3,941,871 discloses a crystalline zeolite essentially free of aluminum and exhibiting an X-ray diffraction pattern characteristic of ZSM-5. Similarly, U.S. Pat. Nos. 4,061,724, 4,073,865 and 4,104,294 describe microporous crystalline silicates or organosilicates in which the aluminum content is at impurity levels.

In addition, it is possible to vary the silica-to-alumina ratio of a naturally-occurring or already-synthesized zeolite by chemical treatment. In particular, in view of the relative instability of aluminum in the crystal lattice of a zeolite, a number of methods have been proposed for removing framework aluminum from a zeolite.

In U.S. Pat. No. 4,503,023 a method is disclosed for replacing framework aluminum in an aluminosilicate zeolite having a silica-to-alumina ratio of at least 3 zeolite with framework silicon by contacting the zeolite with an aqueous solution of a fluorosilicate salt having a pH of 3 to 7 and in an amount such as to provide at least 0.075 moles of fluorosilicate salt per 100 grams of the zeolite. However, although this method has proved effective in raising the silica-to-alumina ratio of zeolites, such as zeolite Y, the treated zeolite is found to contain impurities of insoluble metal fluorides, particularly $AlF_3$, which are not readily removed from the zeolite by simple washing and which can adversely effect the catalytic properties of the zeolite.

In an attempt to overcome this problem, U.S. Pat. No. 4,597,956 discloses a method of treating a zeolite which contains insoluble fluoride with an aqueous solution of a soluble aluminum compound, such as aluminum sulfate, nitrate, chloride and acetate such that the mole ratio of fluoride anion to aluminum cation is reduced to a value less than 3, preferably 2-2.5.

SUMMARY OF THE INVENTION

According to the invention there is provided a method removing tetrahedral aluminum from an aluminosilicate zeolite containing at least 50 ppm of tetrahedral aluminum, comprising the steps of: (a) contacting the zeolite with an aqueous solution containing a fluorocompound of an element different from aluminum capable of reacting with tetrahedral aluminum in said zeolite to remove said tetrahedral aluminum from the zeolite lattice and produce a water-insoluble aluminum fluoride; and (b) contacting the zeolite with an aqueous solution containing a water-soluble fluoride $MF_n$ where M has a valence of n and is selected from the group consisting of hydrogen, ammonium and a metal of Group I or Group II of the Periodic Table capable of reacting with said water-insoluble aluminum fluoride to produce a water-soluble species.

In the above method, where the insoluble fluoride is aluminum fluoride, $AlF_3$, it is believed that the fluoride $MF_n$ reacts with the aluminum fluoride to produce the water-soluble complex fluoroaluminate, $M_3AlF_6$. Thus, contrary to the teaching of U.S. Pat. No. 4,597,956, the treatment method of the invention increases the mole ratio of fluoride anion to aluminum cation to a value above 3 and preferably to 4–6.

In one embodiment of the present invention, the contacting step (a) is effected with an aqueous solution containing said fluorocompound of said element different from aluminum and said water-soluble fluoride $MF_n$ whereby steps (a) and (b) are conducted substantially simultaneously.

In an alternative embodiment step (b) is conducted separately from and after step (a).

DESCRIPTION OF THE DRAWING

The accompanying drawing is a graph comparing the variation in hexane cracking activity over time for (a) untreated zeolite beta, (b) zeolite beta treated with aqueous ammonium fluorosilicate solution in accordance with Example 1 and (c) zeolite beta treated with aqueous ammonium silicate/ammonium fluoride solution in accordance with Example 2.

DESCRIPTION OF THE PREFERRED EMBODIMENTS

The method of the invention can be used to effect aluminum removal from any aluminosilicate zeolite containing at least 50 ppm of framework Al atoms, although preferred zeolites are zeolite Y and zeolites having a Constraint Index of 1–12 when tested at a temperature in the range of 290°–538° C. (see U.S. Pat. No. 4,016,218), particularly zeolite beta and ZSM-5.

Aluminum removal is effected by treating the zeolite with an aqueous medium containing a fluorocompound of an element different from aluminum. The fluorocompound is chosen so as to be capable of reacting with tetrahedral aluminum in the zeolite, generally by initial hydrolysis to fluoride ions which then extract aluminum from the framework as insoluble $AlF_3$, and further is chosen so that said different element is then capable of entering the vacant sites resulting from the aluminum removal. Known suitable fluorocompounds include ammonium fluorosilicate, $(NH_4)_2SiF_6$ (to substitute aluminum with silicon), and ammonium fluorotitanate, $(NH_4)_2TiF_6$ (to substitute aluminum with titanium). Treatment is conveniently effected in known manner and typically at a temperature of 20°–125° C. for 0.2 to 300 hours or more preferably at a temperature of 50°–100° C. for 4 to 24 hours. Preferably the treatment solution contains at least 0.0075 moles of the fluorocompound of the replacement element per hundred grams of the anhydrous zeolite and has a pH less than or equal to 7 or more preferably a pH of 3 to 7. In a particularly preferred embodiment, zeolite Y having a silica-to-alumina molar ratio not greater than 7 and preferably 3 to 6, is treated as described in U.S. Pat. No. 4,503,023 with an aqueous solution of a fluorosilicate, preferably ammonium fluorosilicate, having a pH of 5 to 7 at a temperature of 20° C. to 95° C. to produce the zeolite designated in U.S. Pat. No. 4,503,023 as LZ-210. The entire contents of U.S. Pat. No. 4,503,023 are incorporated herein by reference.

During or after the aluminum removal step, the zeolite is contacted with an aqueous solution of a water-soluble fluoride $MF_n$ where M has a valence of n and is selected from the group consisting of hydrogen, ammonium and a metal of Group I or Group II of the Periodic Table capable of reacting in said aqueous solution with insoluble aluminum flouride generated by the aluminum substitution to produce a water-soluble species. Preferably, the fluoride $MF_n$ is ammonium fluoride.

Where the $MF_n$ treatment is effected simultaneously with the dealumination step, the zeolite is contacted with a single aqueous solution containing said fluorocompound and said fluoride $MF_n$, preferably such that the solution is 0.001 to 3N in said fluoride. The presence of the fluoride $MF_n$ in the treatment solution is found to inhibit the formation of water-insoluble aluminum fluoride during the aluminum substitution so that simple water washing of the treated zeolite is sufficient to effect substantially complete removal of fluoride impurities in the zeolite. It is also found that the presence of the fluoride $MF_n$ in the fluorocompound treatment solution produces a dealuminized zeolite which is more stable to cracking conditions than a zeolite which has undergone aluminum removal using a treatment solution free of fluoride $MF_n$.

Where the $MF_n$ treatment is effected after the dealumination step, the zeolite containing insoluble fluoride $AlF_3$ is treated with an aqueous solution of water-soluble fluoride $MF_n$ under conditions such that the fluoride $MF_n$ reacts with the insoluble fluoride to produce a water-soluble species, typically $M_3AlF_6$, without any loss of structural integrity of the zeolite. Preferably, the concentration of the solution is 0.001 to 5N in the fluoride $MF_n$ and the treatment is conducted at 20° to 100° C. for 0.005 to 20 hours.

The invention will now be more particularly described with reference to the Examples and the accompanying drawing.

EXAMPLE 1

3.6 g of a silica extrudate of zeolite beta in the hydrogen form with silica (65% by wt. zeolite/35% by wt. silica) were ion exchanged with an aqueous solution of 100 ml of 1N $NH_4NO_3$ for 18 hours, whereafter the exchanged catalyst was washed with double-deionized water. The catalyst was then slurried with 45 ml of deionized water and to the slurry was added 35 ml of an aqueous solution containing 0.25 g of ammonium fluorosilicate. The reaction mixture was digested at 80° C. for 5 hours and the resultant product was washed with double-deionized water, dried at 130° C. and designated product A.

The composition and hexane cracking activity at 538° C. for product A were measured and are listed in Table 1, which also includes corresponding data for the initial catalyst.

EXAMPLE 2

10 g of the same zeolite beta extrudate used in Example 1 were exchanged with 200 ml of 1N $NH_4NO_3$ for 24 hours and the exchanged catalyst was washed with double-deionized water. The resultant catalyst was slurried with 90 ml of deionized water and to this slurry were added 5 ml of an aqueous solution containing 0.75 g of ammonium fluorosilicate and 30 ml of 0.2M ammonium fluoride solution. The product was digested at 80° C. for 5.75 hours and then washed with double-deionized water, dried at 130° C. and designated product B. Table 1 also lists the composition and hexane cracking activity at 538° C. for product B.

TABLE 1

| Wt. % | Starting Zeolite | Example 1 Product A | Example 2 Product B |
|---|---|---|---|
| $SiO_2$ | 94.78 | 96.99 | 97.1 |
| $Al_2O_3$ | 2.34 | 1.1 | 1.29 |
| F | — | 0.11 | 0.04 |
| Hexane Cracking Activity at 538° C. | −130 | 60 | 80 |

From Table 1 it will be seen that the retained fluoride content and the hexane cracking activity of the zeolite treated according to the invention were significantly increased as compared with the zeolite treated with ammonium fluorosilicate alone.

The hexane cracking activities of products A and B and the initial catalyst were also measured as a function of time and the results are illustrated graphically in the accompanying drawing. From this drawing, it will be seen that product B was more stable than product A in that the hexane cracking activity of product B increased slightly during the 50 minute test, whereas the activity of product A decreased slightly.

EXAMPLE 3

200 g of ammonium zeolite beta were slurried in a solution containing 500 ml double deionized water, 800 ml 0.2M ammonium fluoride, and 1400 ml 0.2M ammonium fluorosilicate. Following ammonium zeolite addition, the slurry was mixed at room temperature for one hour and then digested for 5.5 hrs. at 80° C. and filtered. The filter cake was thoroughly washed with double deionized warm water (55° C.) and dried at 130° C.

Table 2 lists the composition, hexane cracking activity and crystallinity for product and starting zeolite.

EXAMPLE 4

217 g of the same zeolite beta as in Example 3 were slurried in a solution containing 500 ml double deionized and 820 ml 0.2 ammonium fluoride. The resulting slurry was mixed and heated at 80° C. 1400 ml of 0.2M ammonium fluorosilicate solution were added to the slurry in 1 ml increments at a rate of 15 ml per min. Following ammonium fluorosilicate addition, the slurry was digested for 2.5 hrs. at 80° C. and filtered. The filter cake was thoroughly washed with double deionized war water (55° C.) and dried at 130° C. Table 2 also lists the composition, hexane cracking activity and crystallinity for the resultant product.

TABLE 2

| Wt. % | Untreated Zeolite | Example 3 | Example 4 |
|---|---|---|---|
| $SiO_2$ | 75.23 | 88.68 | 83.30 |
| $Al_2O_3$ | 3.53 | 1.97 | 2.11 |
| F (ppm) | 11 | 61 | 74 |
| Crystallinity, % | 100 | 84 | 84 |
| Hexane Cracking Activity | 793 | 153 | 187 |

EXAMPLE 5

A 10 g sample of zeolite Y ($SiO_2/Al_2O_3=6$) in the ammonium form was slurried with 500 ml of 3.4M ammonium acetate solution 75° C. An aqueous solution prepared by dissolving 3.1533 g of ammonium hexofluorosilicate in 250 ml of water was added drop-wise to the slurry over a period of 2 h. The mixture was allowed to digest overnight (18 h) at 75° C. and the resultant product was filtered and washed with 1500 ml of water. The washed material was vacuum dried at room temperature for 1 h and then dried in an oven at 120° C. for 1 h.

The resultant product was divided into two samples, A and B, each weighing 0.7 g. Sample A was washed with 250 ml of water while sample B was washed with 250 ml of 0.01M ammonium fluoride solution, the temperature of both wash media being 25° C. and the contact time being 0.5 h. Both washed samples were dried to 120° C. and analyzed for fluoride content. The water-washed sample A contained 0.60% by weight of fluoride, whereas the ammonium fluoride-washed sample B contained only 0.32% by weight of fluoride.

What is claimed is:

1. A method of removing tetrahedral aluminum from an aluminosilicate zeolite containing at least 50 ppm of tetrahedral aluminum, comprising the steps of:
    (a) contacting the zeolite with an aqueous solution containing a fluorocompound of an element different from aluminum capable of reacting with tetrahedral aluminum in said zeolite to remove said tetrahedral aluminum from the zeolite lattice and produce a water-insoluble aluminum fluoride; and
    (b) contacting the zeolite with an aqueous solution containing a water-soluble fluoride $MF_n$ where M has a valence of n and is selected from the group consisting of hydrogen, ammonium and a metal of Group I or Group II of the Periodic Table capable of reacting with insoluble aluminum fluoride to produce a water-soluble species.

2. The method of claim 1 wherein the zeolite is zeolite Y.

3. The method of claim 1 wherein the zeolite is zeolite beta.

4. The method of claim 1 wherein the zeolite is ZSM-5.

5. The method of claim 1 wherein said fluorocompound is selected from the group consisting of a fluorosilicate and a fluorotitanate.

6. The method of claim 5 wherein the fluorocompound is ammonium fluorosilicate.

7. The method of claim 1 wherein said aqueous solution contains at least 0.0075 moles of the fluorocompound per 100 g of the anhydrous zeolite.

8. The method of claim 1 wherein said fluoride $MF_n$ is ammonium fluoride.

9. The method of claim 1 wherein steps (a) and (b) are conducted substantially simultaneously using an aqueous solution containing said fluorocompound as said fluoride $MF_n$.

10. The method of claim 9 wherein steps (a) and (b) are conducted at 20°–125° C. for 0.2–300 hours.

11. The method of claim 9 wherein said aqueous solution is 0.001–3N in said fluoride $MF_n$.

12. The method of claim 1 wherein step (a) is conducted prior to step (b).

13. The method of claim 12 wherein said aqueous solution is 0.001N to 5N in said fluoride $MF_n$.

14. The method of claim 12 wherein step (b) is conducted at 20° to 100° C. for 0.005 to 20 hours.

* * * * *